United States Patent
Den Dulk et al.

(10) Patent No.: US 8,440,150 B2
(45) Date of Patent: May 14, 2013

(54) HYDROPHOBIC VALVE

(75) Inventors: Remco Christiaan Den Dulk, Eindhoven (NL); Menno Willem Jose Prins, Rosmalen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 8 days.

(21) Appl. No.: 13/139,459

(22) PCT Filed: Jun. 17, 2009

(86) PCT No.: PCT/IB2009/052561
§ 371 (c)(1),
(2), (4) Date: Jun. 13, 2011

(87) PCT Pub. No.: WO2010/070461
PCT Pub. Date: Jun. 24, 2010

(65) Prior Publication Data
US 2011/0240130 A1    Oct. 6, 2011

(30) Foreign Application Priority Data
Dec. 16, 2008  (EP) .................................... 08171762

(51) Int. Cl.
*B01L 99/00* (2010.01)
(52) U.S. Cl.
USPC ............. 422/537; 422/536; 422/50; 422/500; 422/501; 422/502; 436/180
(58) Field of Classification Search ......... 422/500–504, 422/536–537, 50; 436/180
See application file for complete search history.

(56) References Cited

U.S. PATENT DOCUMENTS

| 6,911,183 B1 * | 6/2005 | Handique et al. ............. 422/502 |
| 2005/0045238 A1 | 3/2005 | Yang |
| 2005/0217743 A1 | 10/2005 | Bohm |
| 2008/0038810 A1 | 2/2008 | Pollack |
| 2008/0213853 A1 | 9/2008 | Garcia |

FOREIGN PATENT DOCUMENTS

| EP | 1707965 A1 | 10/2006 |
| WO | 2002042650 A1 | 5/2002 |
| WO | 2003042410 A1 | 5/2003 |
| WO | 2003072227 A1 | 9/2003 |
| WO | 2007110779 A2 | 10/2007 |
| WO | 2008039130 A1 | 4/2008 |

OTHER PUBLICATIONS

Zabow, G. et al "Guided Microfluidics by Electromagnetic Capillary Focusing" Applied Physics Letters, vol. 80. No. 8, Feb. 25, 2002, pp. 1483-1485.
Andersson, Helene "Microfluidic Devices for Biotechnology and Organic Chemical Applications" Microsystem Technology Department of Signals, Sensors and Systems (S3), 2001.
Liu, Robin H. et al "Single-Use, Thermally Actuated Paraffin Valves for Microfluidic Applications" Sensors and Actuators B 98, 2004, pp. 328-336.

* cited by examiner

*Primary Examiner* — Jyoti Nagpaul (57) ABSTRACT

The present invention relates to a hydrophobic valve for liquids having an appreciable surface tension comprising magnetic particles, said device comprising at least two planar solid substrates with a functionalized surface each, wherein at least a first solid substrate has a patterned surface comprising at least two hydrophilic areas separated from one another by at least one hydrophobic area, wherein the said two planar substrates are disposed with a distance to one another in a sandwiched, parallel fashion, in such way that said functionalized surfaces are facing one another, said valve further comprising a magnetic actuator.

20 Claims, 11 Drawing Sheets

HYDROPHOBIC VALVE

FIELD OF THE INVENTION

The present invention relates to a hydrophobic valve on a microfluidic device.

BACKGROUND OF THE INVENTION

In the last decades, miniaturized sample preparation and analysis units, so called "lab-on-a-chip (LOC)", were introduced. These devices integrate one or several laboratory functions on a single chip of only millimeters to a few square centimeters in size. Their introduction was, at least in part, motivated by the introduction of nucleic acid hybridization technologies for diagnostic, analytic and forensic purposes, and by the increasing demand for high throughput capacities, which were necessitated by increasingly large sample numbers. The development of these devices has been supported by advancements in lithography-based technologies, as well as by new developments in surface coating technologies.

However, control of liquid flow and/or liquid dispersion is still a problem in lab on a chip devices, due to manufacturing problems, as well as lack of controllability of behaviour of liquids in the micro- and nano scale.

Liu et al (2004) have described a single-use, thermally actuated paraffin valve for microfluidic applications, which has a "close-open" function, i.e., it can only open once (non-pinch-off, or tonic actuation mode). Such valve however requires the use of heat, while the molten paraffin may contaminate the samples located on the device, or clog microchannels on the device.

It is the object of the present invention to provide a device which allows control of liquid flow and/or liquid dispersion in a microfluidic device without the disadvantages described above.

It is another object of the present invention to provide a valve for use in a microfluidic device, which can be opened irreversibly upon actuation.

It is furthermore an object of the present invention to provide methods for the manufacture, and for the use, of such device.

These objects are achieved by the method and as set forth under the independent claims. The dependent claims indicate preferred embodiments. In this context it is noteworthy to mention that all ranges given in the following are to be understood as that they include the values defining these ranges.

BRIEF DESCRIPTION OF THE DRAWINGS

Additional details, features, characteristics and advantages of the object of the invention are disclosed in the subclaims, the figures and the following description of the respective figure and examples, which, in an exemplary fashion, show preferred embodiments according to the invention. It is to be understood that the examples are by no means meant as to limit the scope of the invention.

DETAILED DESCRIPTION OF EMBODIMENTS

According to the invention, a hydrophobic valve for liquids having an appreciable surface tension comprising magnetic particles is provided, said device comprising
  a) at least two planar solid substrates with a functionalized surface each, wherein
  b) at least a first solid substrate has a patterned surface comprising at least two hydrophilic areas separated from one another by at least one hydrophobic area,
  c) wherein the said two planar substrates are disposed with a distance to one another in a sandwiched, parallel fashion, in such way that said functionalized surfaces are facing one another,
  d) said valve further comprising a magnetic actuator.

As used herein, the term "liquids having an appreciable surface tension" refers to liquids which are characterized by the attraction between the liquid's molecules by various intermolecular forces. This applies, for example to liquids being composed or polar molecules. In the bulk of the liquid, each molecule is drawn equally in all directions by neighbouring liquid molecules, resulting in a net force of zero. At the surface of the liquid, the molecules are pulled inwards by other molecules deeper inside the liquid and are not attracted as intensely by the molecules in the neighbouring medium (be it vacuum, air or another liquid). Therefore, all of the molecules at the surface are subject to an inward force of molecular attraction which is balanced only by the liquid's resistance to compression, meaning there is no net inward force.

Such liquids tend to build up droplets, in an attempt to achieve lowest surface area possible. Examples for these liquids comprise, but are not limited to, water and aqueous liquids (see below), as well as organic liquids with functional groups, particularly organic acids, ketons, aldehydes and alcohols, like ethanol, glycerol, acetone acetonitrile, dimethylformamide, acetic acid, n-butanol, isopropanol, n-propanol, ethanol, methanol, and formic acid, but also other organic liquids, like 1,4-dioxane, tetrahydrofuran, dichloromethane or dimethyl sulfoxide.

As used herein, the term "hydrophobic" refers to a substrate surface having a contact angle of greater than 90°. The term "superhydrophobic" refers to a substrate surface having a contact angle of greater than 150°.

As used herein, the term "hydrophilic" refers to a substrate surface having a contact angle of less than 90°.

As used herein, the term "contact angle" refers to the angle at which a fluid/fluid interface (e.g. liquid/gas, or liquid/liquid) meets a solid surface. The term "gas", in this context, comprises gaseous fluids, like air, vapour or any other gas. The term "liquid/liquid-interface" refers to an interface built up between to liquids which are immiscible, due to differences in their surface tension. In a preferred embodiment, the term "liquid/liquid-interface" refers to an interface built up between a polar liquid and a non polar liquid, preferably between an aqueous liquid and an oil.

The contact angle is specific for any given system and is determined by the interactions across the three interfaces. Most often the contact angle concept is illustrated with a small liquid droplet resting on a flat horizontal solid surface. The shape of the droplet is determined by the Young-Laplace equation. If a liquid is very strongly attracted to a solid surface (for example water on a strongly hydrophilic solid) a droplet will completely spread out on the solid surface and the contact angle will be close to 0°. Less strongly hydrophilic solids will have a contact angle up to 90°. On many highly hydrophilic surfaces, water droplets will exhibit contact angles of 0° to 30°. If the solid surface is hydrophobic, the contact angle will be larger than 90°. On highly hydrophobic surfaces the surfaces have water contact angles as high as 150° or even nearly 180°. On these surfaces, water droplets simply rest on the surface, without actually wetting to any significant extent.

In a preferred embodiment of the invention, it is provided that the said liquids are aqueous liquids. The term "aqueous liquid", as used herein refers to a liquid which has water as a major solvent.

The hydrophobic area, as described above, serves as a barrier in order to prevent free liquid flow between the at least two hydrophilic areas.

The magnetic actuator is, in its rest position, disposed beneath the border of the first hydrophilic area and the hydrophobic area (separation area). Its presence causes the magnetic particles to assemble in the area where the magnetic actuator is disposed.

Upon actuation of the magnetic actuator, the latter travels into the direction of the second hydrophilic area. Aqueous liquid comprising magnetic particles is thus forced to build up a passage of aqueous liquid bridging the hydrophobic area in a fashion described below, thus connecting the two hydrophilic areas. As long as the said passage is established, the hydrophobic valve is in an "open" position.

Whether or not the hydrophobic valve returns into a "closed" position once the actuator has passed the said hydrophobic area and comes to a rest in the second hydrophilic area, depends on the functionalization of the second solid substrate.

In case the second solid substrate has a hydrophilic surface, the said passage of aqueous liquid bridging the hydrophobic area remains intact (valve remains in an "open" position), while in case the second solid substrate has a hydrophobic surface, the said passage of aqueous liquid bridging the hydrophobic area breaks down (returns into a "closed" position). The latter is also called "pinch off behaviour".

The reasons for these differences in behaviour are the different sums of contact angles. The sum of contact angles of an aqueous liquid disposed between a hydrophilic substrate and a hydrophobic substrate is about approximately 180°. The capillary forces resulting from both angles neutralize each other, which means that no net force acts on the meniscus of the liquid droplet. Therefore, the meniscus will not move and a stable situation is created.

In contrast thereto, the sum of contact angles of an aqueous liquid disposed between two hydrophobic substrates is always >180°. This means that capillary forces act on the meniscus, which results in a pinch off. See FIG. 3 for an illustration of these phenomena.

As used herein, the term "functionalized surface" refers to a surface which has been equipped with a given function, e.g. a hydrophobic or hydrophilic surface.

As regards functionalized surfaces having hydrophobic properties, the easiest embodiment is that no particular functionalization has been carried out, as many substrates are, in their native state, hydrophobic. Polypropylene has, for example, a contact angle of about 105°. It is then possible to produce a hydrophilic pattern on such substrate.

However, if native hydrophobic properties aren't good enough, or if for some reason a substrate is being used which has hydrophilic properties, hydrophobic functionalization can for example be achieved by application of a hydrophobic coating. Examples for a functionalized surface thus obtained comprise
  silanized substrates,
  fluorocarbon-coated substrates,
  substrates being equipped with a Lotus effect,
  thiol-coated substrates, and/or
  self-assembled monolayers.

The term "self-assembled monolayers" (SAM), as used herein, shall refer to surfaces consisting of a single layer of molecules on a substrate. Self assembled monolayers can be prepared simply by adding a solution of the desired molecule onto the substrate surface and washing off the excess, or by evaporation.

Some commonly used SAMs include 8-Amino-1-octanethiol, hydrochloride, 6-Amino-1-hexanethiol, hydrochloride, 10-Carboxy-1-decanethiol, 7-Carboxy-1-heptanethiol. Preferably, thiol-based SAMs are produced on gold surfaces, whereas silan-based SAMs are produced on glass surfaces. In both cases, the remainder of the respective SAM-building molecule determines the hydrophilicity or hydrophobicity. Silanes may for example contain fluorcarbon chains, and are then hydrophobic, or they contain carbon oxygen chains (like polyethyleneglycol), and are then hydrophilic.

Thiol coatings may for example be used for gold or silver substrates. A preferred thiol in this context is Octadecanethiol, which has a contact angle of about 110°.

The term "Lotus effect", as used herein, shall refer to a substrate which has superhydrophobic properties due to a complex microscopic architecture of the surface, the latter having a pattern of protrusions with 5 to 40 µm in height and 5 to 30 µm in width. Surfaces equipped in such way show contact angles of up to 170°.

Agents accounting for a hydrophobic functionalization of a glass or SiOx surface are, for example fluorinated silanes, like perfluorodecyl-tri-etoxysilane. Therein, the silane groups bind to the glass surface, and the fluorocarbon tail creates a hydrophobic environment. Such fluor-rich SAM has a contact angle of about 105°. The skilled person may, from general knowledge or from textbooks and databases, select other fluorinated silanes without the need of inventive step.

Agents accounting for a hydrophobic functionalization of a glass or SiOx surface are, for example fluorinated silanes, like perfluorodecyl-tri-etoxysilane. Therein, the silane groups bind to the glass surface, and the fluorocarbon tail creates a hydrophobic environment. Such fluor-rich SAM has a contact angle of about 105°. The skilled person may, from general knowledge or from textbooks and databases, select other fluorinated silanes without the need of inventive step. Other silanes useful in this context comprise
  1H,1H,2H,2H-perfluorohexyltrichlorosilane, 1H,1H,2H,2H-perfluorohexyltrimethoxysilane, 1H,1H,2H,2H-perfluorohexyltriethoxysilane,
  1H,1H,2H,2H-perfluorooctyltrichlorosilane, 1H,1H,2H,2H-perfluorooctyltrimethoxysilane, 1H,1H,2H,2H-perfluorooctyltriethoxysilane,
  1H,1H,2H,2H-perfluorodecyltrichlorosilane 1H,1H,2H,2H-perfluorodecyltrimethoxysilane, 1H,1H,2H,2H-perfluorodecyltriethoxysilane, 1H,1H,2H,2H-perfluorododecyltrichlorosilane, 1H,1H, 2H,2H-perfluorododecyltrimethoxysilane, 1H,1H,2H, 2H-perfluorododecyltriethoxysilane, Furthermore, ethoxysilanes are useful in this context. This group comprises, among others, Alkyl(dimethyl)ethoxysilanes, Tetraethoxysilane, methyltriethoxysilane and dimethyldiethoxysilane.

An example for fluorocarbon-coated substrates are Polymethylmethacrylate (PMMA) slides spin-coated in Tetrafluoethylen ("Teflon", e.g., Teflon AF 1600). Such surface has a contact angle of about 115°. Another example is Tetrafluormethane ($CF_4$). While a teflon coating is achieved by spin-coating or dip-coating, a Tetrafluormethane coating is achieved by plasma deposition.

As regards functionalized surfaces having hydrophilic properties, the easiest embodiment is that no particular functionalization has been carried out, as many substrates are, in their native state, hydrophilic (glass, metal, many polymers, etc). For example, glass substrates have a contact angle of about 45°, whereas polymethylmethacrylate substrates have a contact angle of about 75°. It is then possible to produce a hydrophobic pattern on such substrate.

However, if native hydrophilic properties aren't good enough, or if for some reason a substrate is being used which has hydrophobic properties, hydrophilic functionalization can for example be achieved by poly(ethylene glycol)silane-treatment ("PEG-silane", in which the silane groups bind, among others, to a glass surface, and the PEG-group create a hydrophilic environment), or plasma polymerization.

Plasma polymerization is a process which uses plasma sources to generate a gas discharge that provides energy to activate or fragment gaseous or liquid monomer, often containing a vinyl group, in order to initiate polymerization. The process can be used to deposit thin polymer films on a surface. By selecting the monomer type and the energy density per monomer, known as Yasuda parameter, the chemical composition and structure of the resulting thin film can be varied in a wide range. A hydrophilic polymer composite can for example be obtained by creating a thin film polymerized from hexane, which provides covalent bonding sites for the outer layer polymerized from N-vinyl-2-pyrrolidone.

The pattern of hydrophobic and hydrophilic areas, as provided on the first solid substrate, may for example be accomplished by 1) coating the substrate with an agent providing hydrophobic properties, e.g., by spin coating, dip coating, chemical vapor deposition, or growing a SAM, and
2) removing, in a patterned fashion, the said agent from those areas which are supposed to have hydrophilic properties, e.g., by plasma etching.

As regards step (1), growing a SAM is preferred because surfaces thus obtained are easier to remove, in a patterned fashion, by plasma etching.

Spincoating or dipcoating can for example be used to create Teflon-coated surfaces (see above).

Chemical vapor deposition (CVD) techniques are also well suited. This approach comprises technologies such as plasma enhanced chemical vapor deposition (PECVD), which are well known to the person skilled in the art. Surface coatings obtained therewith can as well be removed, in a patterned fashion, by plasma etching. Coatings comprising SiOC can for example be created by means of PECVD, but Teflon coatings can be produced as well.

As used herein, the term "plasma etching" shall refer to any process which, from a plasma, effects the removal of material. These include, for example, reactive ion etching (RIE), wherein, in addition to ion bombardment, reactive components of the gas atmosphere used are also active. Reactive ion etching allows in particular anisotropic etching. ICP (inductively coupled plasma) processes are also included in the term plasma etching. Furthermore, combinations of RIE and ICP processes are also possible.

Another possibility to create a pattern of hydrophobic and hydrophilic areas is to only locally apply a hydrophobic surface modification (e.g., by spin coating, dip coating, chemical vapor deposition, or growing a SAM) in a patterned fashion on a native hydrophilic substrate, or vice versa.

Yet another possibility is the use of photolithographic techniques to define a pattern with photoresist. After applying a coating on the complete substrate, coating material in the non-patterned areas can be removed with a lift-off process.

Magnetic particles are often used in the context of microfluidic devices, in which they fulfil a number of roles Magnetic beads can be coated with capturing agents, like streptavidin, chitin, olignucleotide probes or antibodies, which allow the binding of biological entities, like cells (magnetic bead based cell separation), nucleic acids or proteins (magnetic bead based immunoprecipitation). Later on, the magnetic beads carrying the said biological entities are collected by means of magnetic forces A similar approach is being done with magnetic beads coated with silica. These beads bind nucleic acids in the presence of chaotropic salts ("boom principle").

Magnetic beads may be used to agitate a liquid in a microfluidic device by means of magnetic forces. This may help to stir a reaction chamber, or to disrupt cells which are to be lysed in order to release their content As used herein, the term "magnetic" refers to materials which are either magnetic (i.e., they produce a magnetic field, also termed ferromagnetic), paramagnetic (i.e., they do not produce a magnetic field by themselves, but are attracted to magnetic fields, i.e., they have a relative magnetic permeability greater than one), superparamagnetic (i.e., composed of small ferromagnetic clusters that can randomly flip direction under thermal fluctuations, in such way that the material as a whole is not magnetized except in an externally applied magnetic field), and/or diamagnetic (i.e., they create a magnetic field in opposition of an externally applied magnetic field).

The said beads may, in another example, comprise iron oxides, for example magnetite ($Fe_3O_4$), or maghemite (gamma $Fe_2O_3$, both being either superparamagnetic or ferromagnetic).

In a preferred embodiment, the diameters of the said beads are in the range of $\geq 3$ nm and $\leq 1000$ μm. Particularly preferred, the diameters of the said beads are in the range of $\geq 10$ nm and $\leq 100$ μm. More preferred, the diameters of the said beads are in the range of $\geq 50$ nm and $\leq 10$ μm.

In a preferred embodiment, the magnetic actuator is selected from the group consisting of at least one permanent magnet at least one electromagnet Generally, an electromagnet comprises merely a wire which generates a magnetic field when an electric current passes through it. In some more sophisticated cases, the wire is wound around a core of a magnetic material, preferably a metal core. The latter enhances the magnetic field.

In a preferred embodiment, the magnetic actuator comprises a travelling mechanism which allows travelling the same in a parallel fashion with respect to the solid substrates. Some preferred embodiments related to said travelling mechanism are given below.

In another preferred embodiment, the magnetic actuator consists of an array of electromagnets which are switched on and off in a coordinated fashion, in order to obtain a travelling magnetic field. In this embodiment, the magnetic actuator has no movable parts. This results in less maintenance problems, and leads to higher accuracy at lower cost, while switching speeds increase and manufacturing costs decrease.

In another preferred embodiment, at least one strong permanent magnet and/or at least one strong electromagnet creating a static magnetic field is being used to create a static magnetic field, while a smaller magnet (permanent magnet, electromagnet, array of electromagnets or coils) serves to drive the magnetic beads, and thus open and/or close the hydrophobic valve.

In that case, the permanent uniform field gives maximum magnetization of the para- or superparamagnetic beads, while the non-uniform field gives a large gradient of the magnetic field.

In another preferred embodiment, the second solid substrate has a hydrophilic surface. In such embodiment (see device 2 of example 1), the hydrophobic valve remains in an "open" position even when the actuator has passed the hydrophobic area and comes to a rest in the second hydrophilic area. The passage of aqueous liquid bridging the hydrophobic area remains stable in this case and no pinch off is observed. This mode of valve actuation is also termed "tonic valve actuation mode". This mode is particularly useful, e.g., in case the content of two chambers is to be mixed.

In yet another preferred embodiment, the second solid substrate has a hydrophobic surface. Basically, in such embodiment (see device 1 of example 1), the hydrophobic valve remains in an "open" position as long as the actuator remains in a position near the hydrophobic area which separates two neighboring hydrophilic areas. Once the actuator has passed the said hydrophobic area and comes to a rest in the second hydrophilic area, the passage of aqueous liquid bridging the hydrophobic area breaks down, and the valve returns into a "closed" position, and a pinch off is observed. This mode of valve actuation is also termed "phasic valve actuation mode", or "pinch off" mode. This mode is particularly useful, e.g., in case magnetic particles, or compounds or substances bound thereto, are to be delivered from one chamber to another, without mixing the content of the chambers, thus minimizing cross-contamination.

It is particularly preferred that at least one hydrophobic surface of the first solid substrate and/or the second solid substrate is selected in such way that it has a large contact angle hysteresis. This embodiment supports the "tonic valve actuation mode", as described above, for the reasons as follows:

If one measures the contact angle of a liquid droplet while the volume of the droplet is increasing—practically this is done just before the wetting line starts to advance—one gets the so called "advancing contact angle" ($\theta_A$). If one decrease the volume of droplet which has already wettened a surface, and determines the contact angle just before the wetting line is receding, one measures the so called "receding contact angle" ($\theta_R$). Generally, $\theta_A$ is significantly higher than $\theta_R$. The difference $\theta_A$-$\theta_R$ (or $\Delta\theta$) is called contact angle hysteresis. The equilibrium contact angle ($\theta_0$) can be calculated from $\theta_A$ and $\theta_R$ as according to the following equation $$\theta_C = \arccos\frac{r_A\cos\theta_A + r_R\cos\theta_R}{r_A + r_R} \quad \text{(Eq. 1)}$$

where $$r_A = \sqrt[3]{\frac{\sin^3\theta_A}{2 - 3\cos\theta_A + \cos^3\theta_A}} \quad \text{(Eq. 2)}$$

and $$r_R = \sqrt[3]{\frac{\sin^3\theta_R}{2 - 3\cos\theta_R + \cos^3\theta_R}} \quad \text{(Eq. 3)}$$

The confinement of liquid in a functionalized area is mainly determined by the advancing contact angle, while the pinch-off process is governed by the receding contact angle.

This means that a hydrophobic valve which is not meant to show pinch off behaviour ("phasic valve") takes benefit from a large contact angle hysteresis of the first solid substrate. A high advancing contact angle $\theta_A$ angle results in better confinement of the liquid ("hydrophobicity") while a low receding contact angle $\theta_R$ prevents very well the pinch-off process. With a large hysteresis, both of these can be achieved.

The following table gives an overview contact angle hysteresis values for some selected coatings:

TABLE 1

| Parameter | Teflon | Teflon | Teflon | Tetrafluormethane |
|---|---|---|---|---|
| Coating method | PECVD | Spin coating | DIP coating | PECVD |
| $\theta_0$ (water/air) | 100° | 103° | 115° | 75° |
| $\Delta\theta$ (water/air) | 27° | 14° | 12° | 70° |
| $\theta_A$ (water/air) | 113.5° | 110° | 121° | 110° |
| $\theta_R$ (water/air) | 86.5° | 96° | 109° | 40° |

In Table 2, the said phenomena are summarized

TABLE 2

| | functionalization | functionalization | functionalization |
|---|---|---|---|
| first solid substrate | hydrophilic areas in a hydrophobic background; hydrophobic areas optionally have large contact angle hysteresis | hydrophilic areas in a hydrophobic background; hydrophobic areas optionally have large contact angle hysteresis | hydrophilic areas in a hydrophobic background |
| second solid substrate | fully hydrophilic | fully hydrophobic, with large contact angle hysteresis | fully hydrophobic |
| pinch off? | no | no | yes |

The above contact angles are only a rough estimate, as the contact angle is almost never a fixed number. Generally, there is a difference between the advancing contact angle and the receding contact angle.

The invention further provides a microfluidic device is provided comprising the valve according to the invention.

As used herein, the term "microfluidic device" refers to a device for the handling and manipulation of microscale fluids, the latter being geometrically constrained to a small, typically sub-millimeter, scale (nano-, pico- or femtoliters). The behavior of such fluids can differ from 'macrofluidic' behavior in that factors such as surface tension, energy dissipation, and fluidic resistance start to dominate the system. Microfluidic devices do often play a role in the handling and manipulation of liquid biological samples, which often come only in small quantities. They are often part of a lab-on-a-chip-environment.

As used herein, the term "lab-on-a-chip" (LOC) refers to a device that integrates one or several laboratory functions on a single chip of only millimeters to a few square centimeters in size. The said functions comprise Real-time PCR, Biochemical assays, Immunoassays, Dielectrophoresis, cell sample preparation and the like.

It is worth mentioning that in microfluidic devices of the above kind, transport of liquids takes often place by means of capillary forces, i.e. no active pumping is required. This means that liquid which is disposed in a chamber will automatically flow to another chamber once the passage between the two chambers is opened by means of a valve, e.g. a hydrophilic valve as described herein.

However, pumping may become necessary under certain circumstances. The skilled person may select any suitable pump from the art without the application of inventive step.

Particularly preferred, pumping is done by means of
  peristaltic pumps
  piezo-driven pumps, and/or
  syringe pumps.

In a preferred embodiment it is provided that the width of at least one hydrophobic area of the microfluidic device is smaller than the widths of it's neighboring hydrophilic areas. Generally, the hydrophobic area forms what is herein being called a "hydrophobic barrier", or a "separation area". This area may have a with of $\geq 0.02$ mm and $\leq 10$ mm, preferred of $\geq 0.05$ mm and $\leq 3$ mm, more preferred of $\geq 0.5$ mm and $\leq 3$ mm In another preferred embodiment it is provided that the microfluidic is part of a lab-on-a-chip-environment.

The invention further provides a Lab-on-a-chip device, said device comprising the microfluidic device according to the invention.

In preferred embodiments, the Lab-on-a-chip device according to the invention further comprises at least one device from the group consisting of:
  Cell sample preparation device
  Sampler agitation unit (stirrer)
  Nucleic acid isolation device
  Nucleic acid purification device
  Nucleid acid extraction device
  Sample preparation device
  Immunoassay
  Electrophoresis device
  Nucleic acid hybridization unit
  PCR thermocycler
  Fluorescence read out unit
  on-chip chemical reaction applications The invention further provides a method for controlling liquid flow in a microfluidic device according to the invention, in which at least one first hydrophilic area is loaded with an aqueous liquid comprising magnetic particles, said method comprising
  a) creating a magnetic field at a position near a first hydrophilic area
  b) travelling the magnetic field in a direction parallel to the directions of the two planar solid substrates from a position near a first hydrophilic area to a position near a second hydrophilic area;
  c) the travelling magnetic field, on its way, passing by a position near a hydrophobic area which separates the said hydrophilic areas;
  d) thereby creating, at least temporally, a passage of aqueous liquid bridging the hydrophobic area which separates the said hydrophilic areas; in such way that aqueous liquid may pass, at least temporally, from the first hydrophilic area to the second hydrophilic area.

DISCUSSION OF THE FIGURES

The following figures illustrate schematically some essential aspects of the invention.

Figure 1:
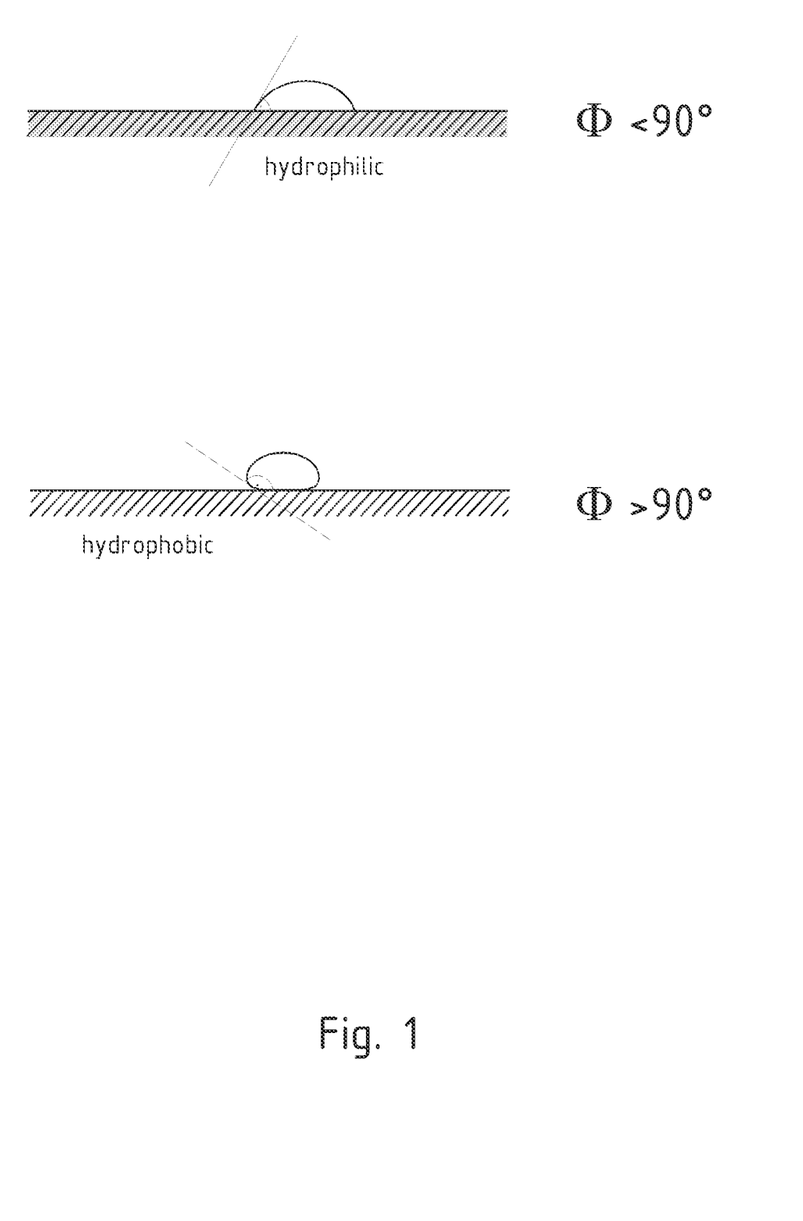
FIG. 1 shows contact angles of a fluid/fluid interface (e.g. liquid/gas or liquid/liquid) on a solid surface.

FIG. 1 shows at which contact angle a fluid/fluid interface (e.g. liquid/gas or liquid/liquid) can meet a solid surface. In case of a water/air interface on a hydrophilic substrate, the water is strongly attracted to the solid surface and the droplet will spread out on the surface. Same applies for a water/oil interface.

Thus, the contact angle between an aqueous liquid and a hydrophilic solid substrate (grey shaded area) is typically <90°. In contrast, on a hydrophobic substrate a hydrophilic solution has a contact angle larger than 90°.

Figure 2:
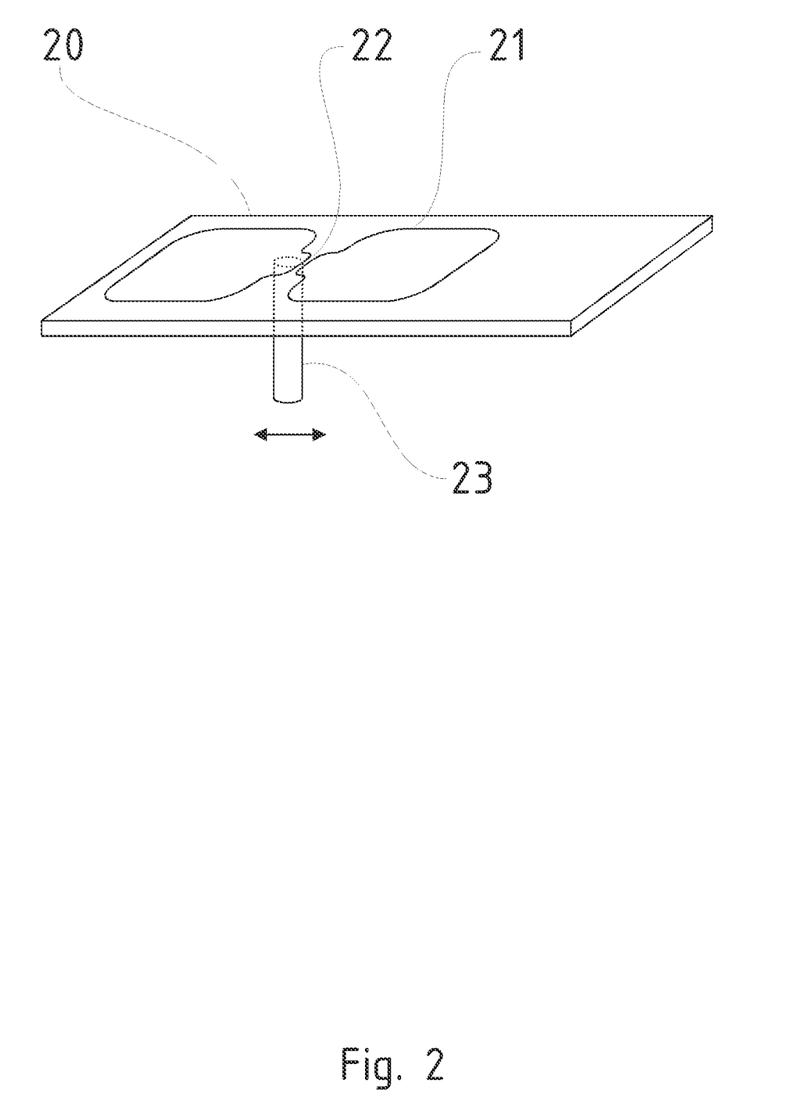
FIG. 2 shows a schematic drawing of a device according to the invention.

FIG. 2 shows a schematic drawing of a device according to the invention, comprising a planar solid substrate with a functionalized surface 20, which is patterned in such way that it comprises two hydrophilic areas 21 separated from one another by one hydrophobic area 22. The device comprises a movable permanent magnet as magnetic actuator 23 according to the invention.

Figure 3A:
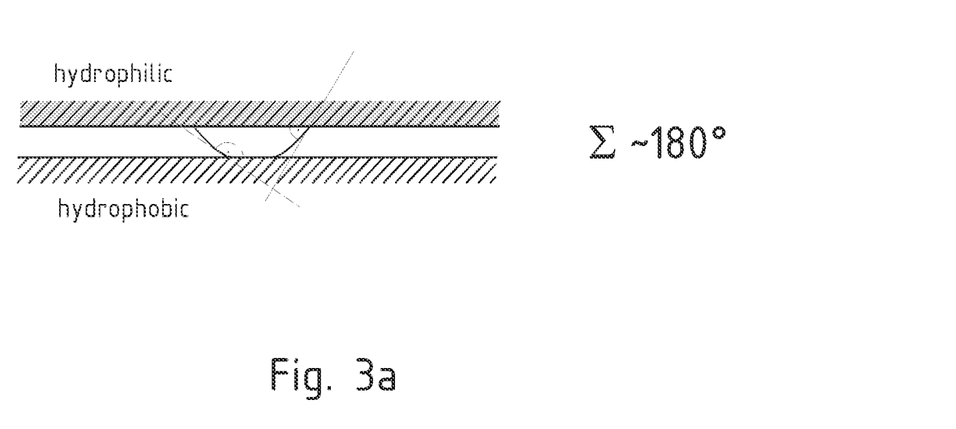
FIG. 3 shows contact angles of a water/air interface (or water/oil) disposed between a different substrates.
Figure 3B:
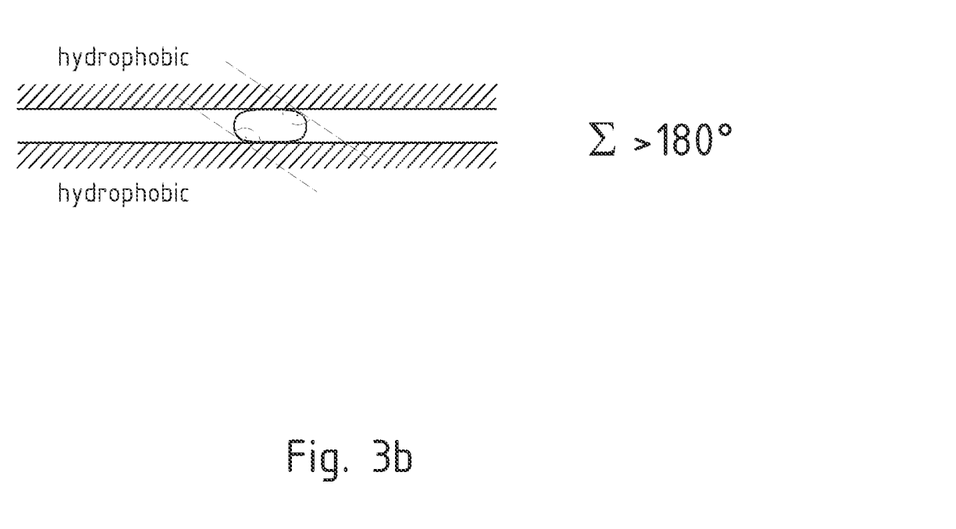

FIG. 3a shows that the sum of contact angles of a water/air interface (or water/oil) disposed between a hydrophilic substrate and a hydrophobic substrate is about approximately 180°, whereas FIG. 3b shows that the sum of contact angles of a water/air interface (or water/oil) disposed between two hydrophobic substrates is always >180°.

The principle as shown in FIG. 3a is the basis for a non-pinch-off valve (tonic actuation mode) according to the invention. Here, it may be provided that at least one hydrophobic area of the first substrate is selected in such way that it has a large contact angle hysteresis, in order to support the non pinch-off behaviour. See text for explanations. The principle as shown in FIG. 3b is the basis for a pinch-off valve (phasic actuation mode) according to the invention.

Figure 4:
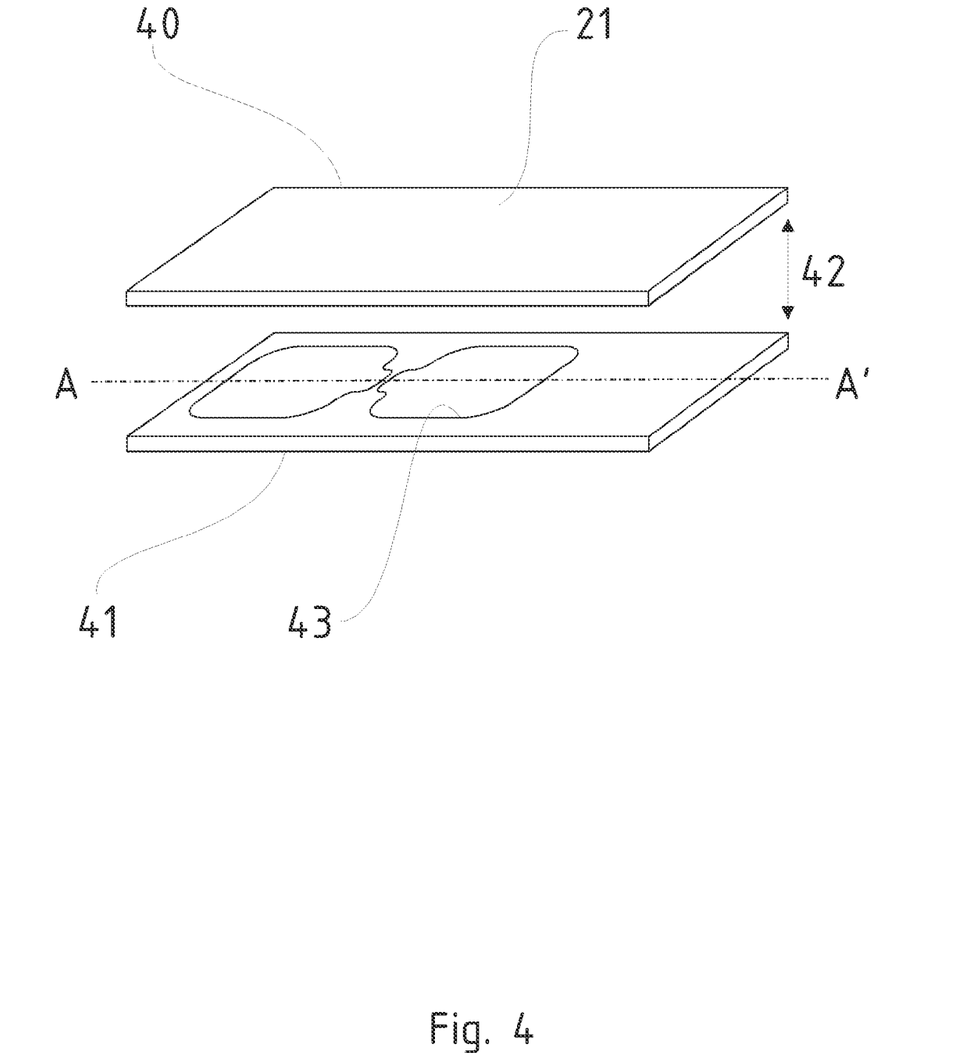
FIG. 4 shows a schematic drawing of another device according to the invention

FIG. 4 shows a schematic drawing of a device according to the invention, comprising a parallel arrangement of two planar solid substrates 40, 41, which are disposed at a distance 42 from each other and face each other. The lower substrate comprises a patterned surface with two hydrophilic areas 43.

Figure 5:
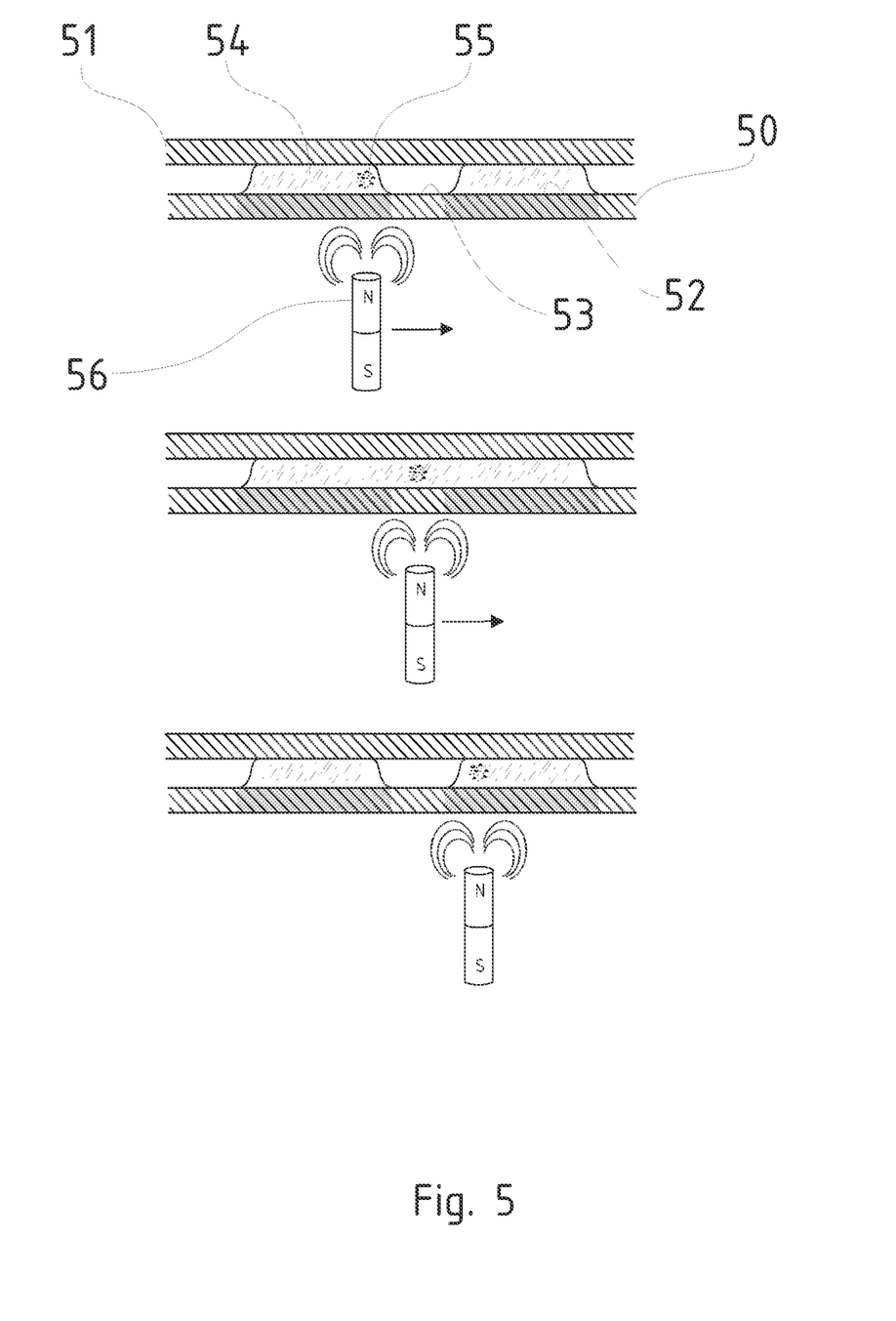
FIG. 5 shows a cross section of a device according to FIG. 4.

FIG. 5 shows a cross section of a hydrophobic valve along line A-A' of FIG. 4. In this example a first solid substrate 50 has a patterned surface with hydrophilic areas 52 (grey shaded) within a hydrophobic surface, whereas a second solid substrate 51 has a fully hydrophobic surface. Between the hydrophilic areas 52 of the first substrate 50 a separation area 53 is thus formed.

The space described by the hydrophilic areas of the first substrate 50 is filled with aqueous liquid 54, which is kept in position because they are encircled by hydrophobic surfaces. One of the droplets contains a cloud of magnetic particles 55. It is noteworthy that in FIG. 5 as well as in the remaining figures, the remaining space in the device may be filled with air (water/air interface) or another gas, or with an oil (water/oil interface) or another non-polar liquid.

The magnetic actuator consisting of a permanent magnet 56 is positioned beneath the border of the first hydrophilic area and the hydrophobic area (separation area 53). It's presence causes the magnetic particles to assemble in this region of the droplet. Through moving the magnetic actuator 56 these magnetic particles are forced to follow this movement, and thus bridge the hydrophobic separation area 53, thus forming a passage from one hydrophilic area to the other one.

As long as the magnetic actuator is situated beneath the hydrophobic area, this passage is maintained and the hydrophobic valve is in an "open" position. Once the magnetic actuator is moving further, the liquid connection at the valve breaks and retreats from the separation area back to the hydrophilic regions. In other words, a pinch-off is observed.

Figure 6:
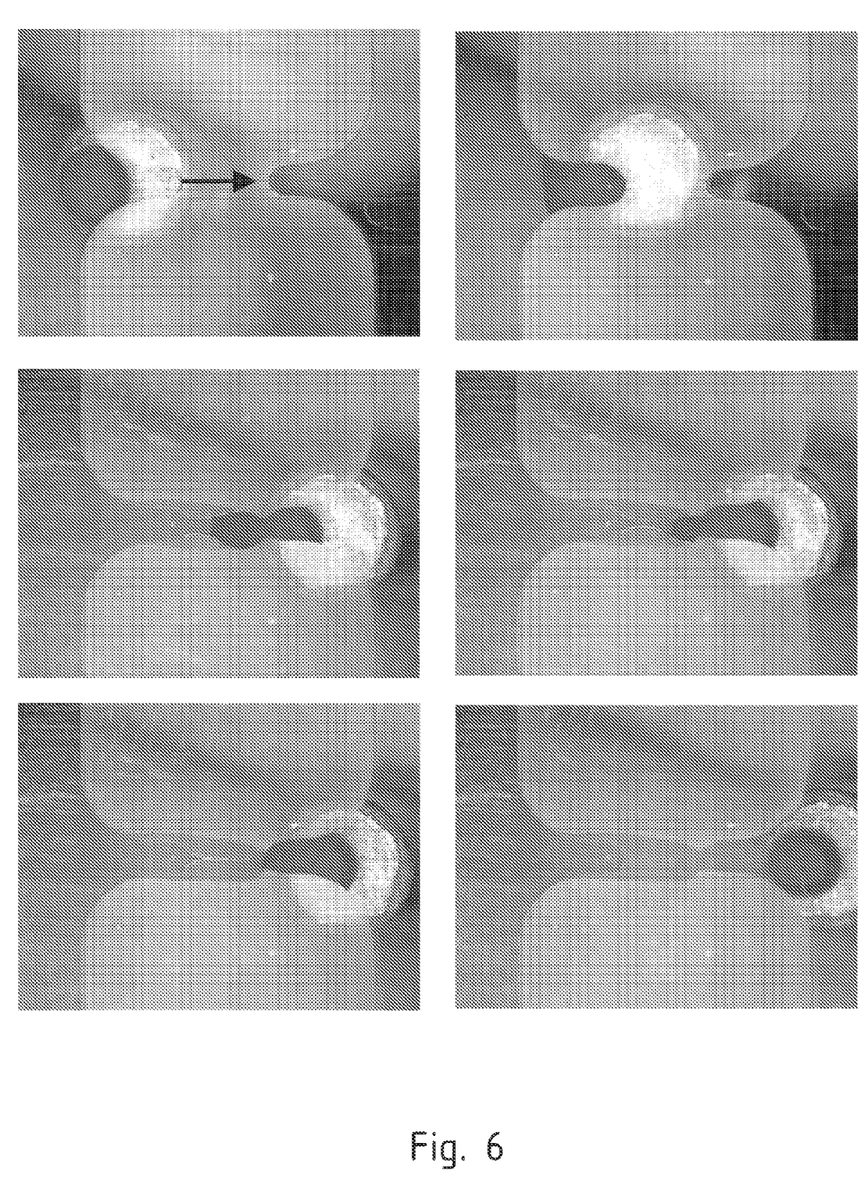
FIG. 6 shows a sequence from a movie file, showing a device according to the invention.

FIG. 6 shows a sequence from a movie file, showing a chamber according to device 1 (i.e., second solid substrate is hydrophobic), filled with liquid, one of them containing a cloud of magnetic particles. These magnetic particles are transferred from the left chamber to the right over a hydrophobic barrier. After the passage of the particles, the liquid connection at the valve breaks and retreats back from the valve area into the chambers. In other words, good pinch-off is observed. The increased transparency that is observed at the valve after the passage of the particles is an optical artefact, caused by the removal of condensate.

Figure 7:
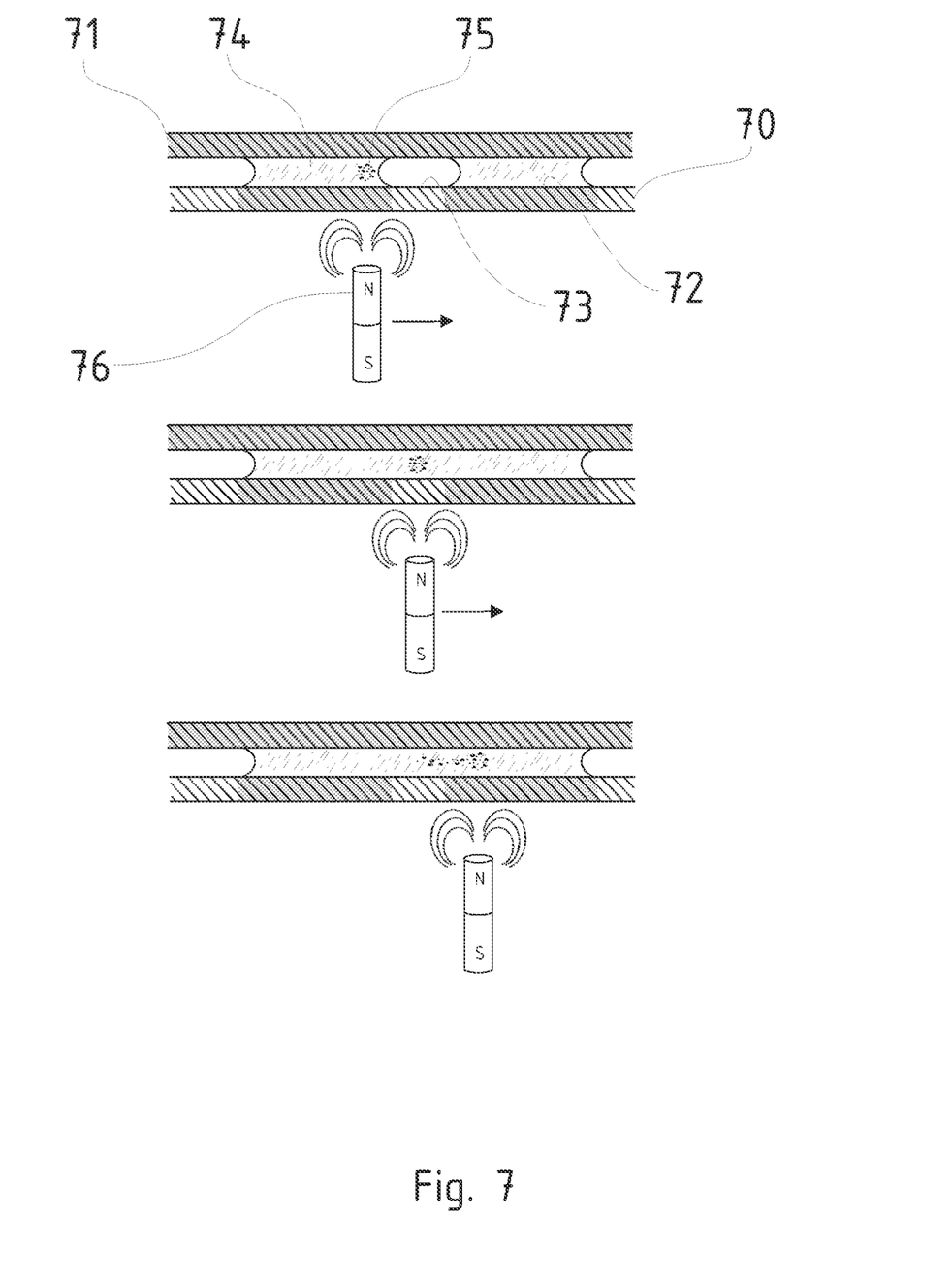
FIG. 7 shows a cross section of another device according to FIG. 4.

FIG. 7 shows a cross section of a hydrophobic valve along line A-A' of FIG. 4. In this example a first solid substrate 70 has a patterned surface with hydrophilic areas 72 (grey shaded) within a hydrophobic surface, whereas a second solid substrate 71 is fully hydrophilic (grey shaded). Between the hydrophilic areas of the first substrate 70 a separation area 73 is thus formed.

The space described by the hydrophilic areas of the first substrate 70 is filled with aqueous liquid 74, which are kept in position because they are adjacent to the hydrophobic separation area 73. One of the droplets contains a cloud of magnetic particles 75.

The magnetic actuator consisting of a permanent magnet 76 is positioned beneath the border of the first hydrophilic area and the hydrophobic area (separation area 73). Its presence causes the magnetic particles to assemble in this region of the droplet. Through moving the magnetic actuator 76 these magnetic particles are forced to follow this movement, and thus bridge the hydrophobic barrier 73, thus forming a passage from one hydrophilic area to the other one. In contrast to device 1 the liquid connection at the valve does not break and remains present, even after the magnetic particles have passed to the right hydrophilic area of the first substrate and the magnetic actuator 76 has been moved beneath the right hydrophilic area of the first substrate. In other words a tonic valve actuation mode is observed.

Figure 8:
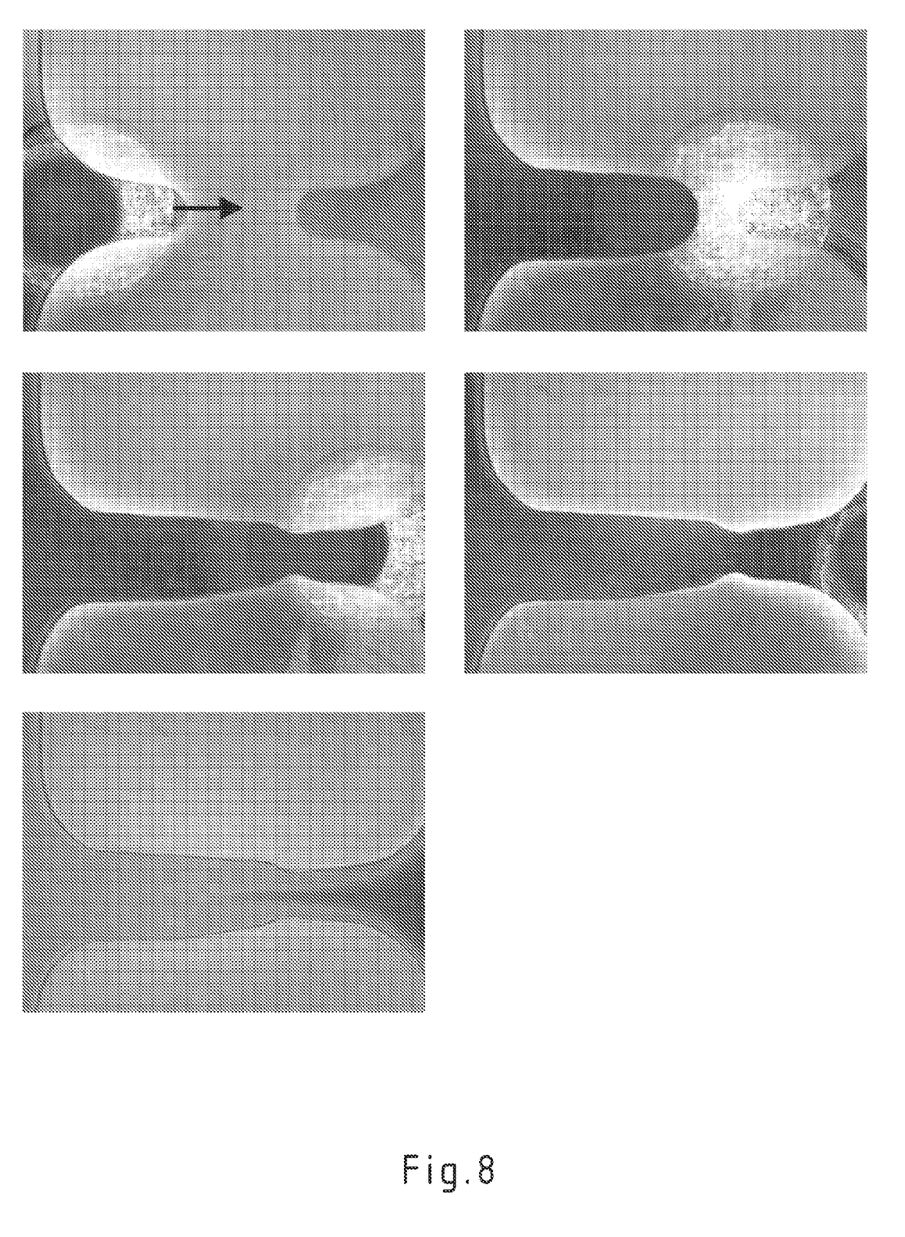
FIG. 8 shows a sequence from a movie file, showing another device according to the invention.

FIG. 8 shows a sequence from a movie file, showing a chamber according to device 2 (i.e., second solid substrate is hydrophilic), filled with liquid, one of them containing a cloud of magnetic particles. These magnetic particles are transferred from the right chamber to the left over a hydrophobic barrier. After the passage of the particles, the liquid connection at the valve does not break and remains present. Especially the last picture clearly shows this, because magnetic particles are observed flowing back into the liquid connection that remains present over the valve area. In other words, no pinch-off is observed.

Figure 9:
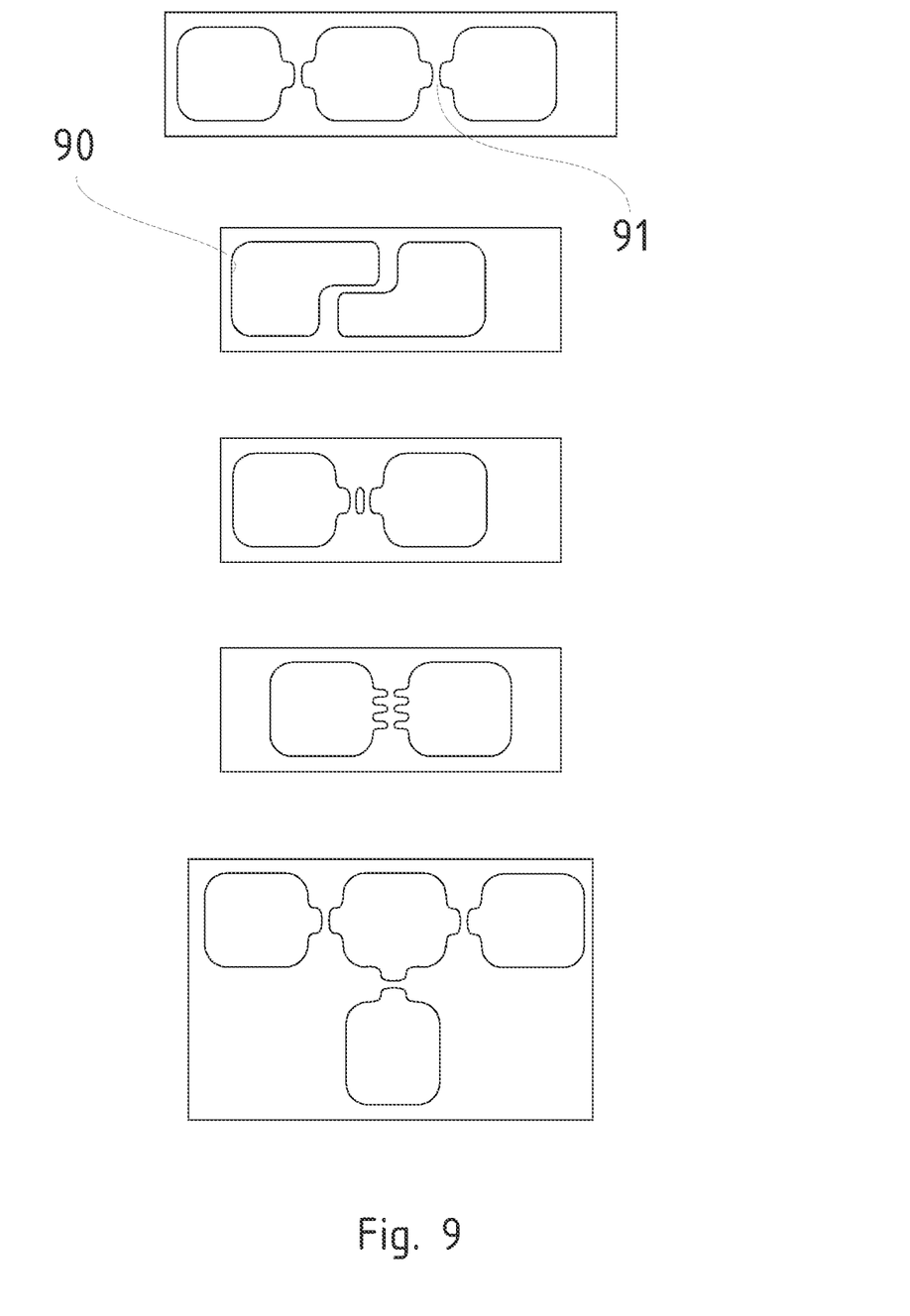
FIG. 9 shows different embodiments of a device according to the invention.

FIG. 9 shows different embodiments of a device according to the invention, which differ from one another in the arrangements of the hydrophilic areas 90. In all cases, the width of at least one hydrophobic area 91 is smaller than the widths of it's neighboring hydrophilic areas 90. The second solid substrate and the magnetic actuator are not shown for reasons of clarity.

Figure 10A:
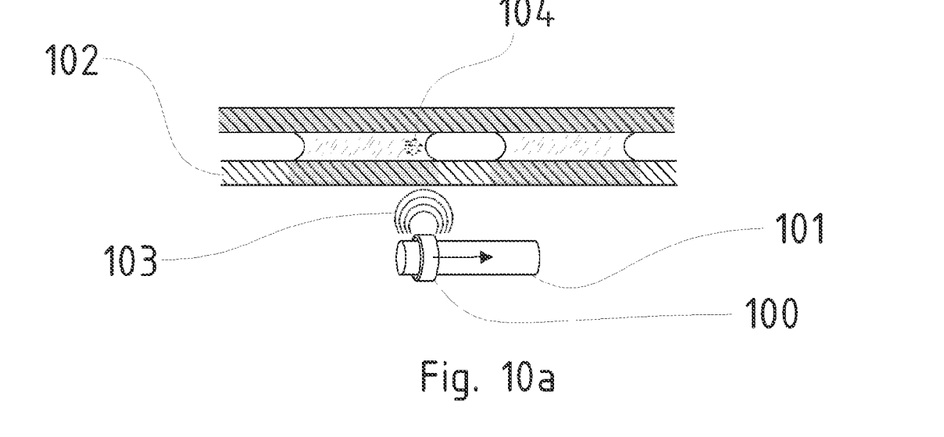
FIG. 10 shows different embodiments of the magnetic actuator of a device according to the invention.

FIG. 10 shows different embodiments of the magnetic actuator discussed above. In FIG. 10a, the magnetic actuator 100 comprises a travelling mechanism 101 (e.g. a rail), which allows moving the magnetic actuator in a parallel fashion with respect to the solid substrates 102, thereby moving the magnetic field 103 and hence the magnetic particles 104 in the liquid.

Figure 10B:
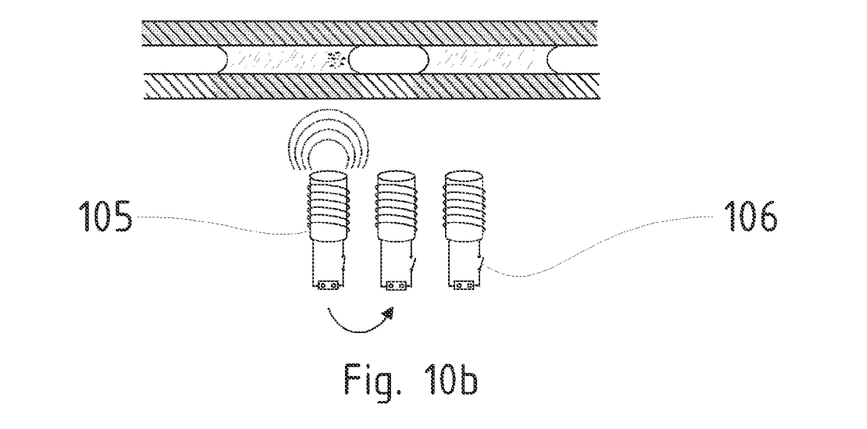

In FIG. 10b the magnetic actuator consists of an array of electromagnets 105, which can be switched on and off in a coordinated fashion. The magnetic field thus travels via activating and deactivating the individual electromagnets in a coordinated sequence. Switches 106 symbolize the switching mechanism, which is not limited to mechanical switches, but can as well be semiconductor switches, like transistors, logical switches, or any other devices known from the art which allow a coordinated travelling of a magnetic field in an array of electromagnets.

Figure 10C:
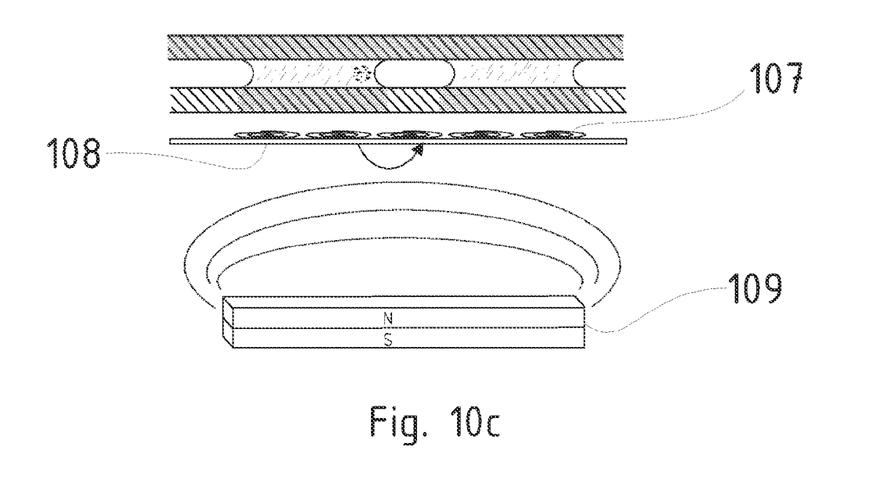

In FIG. 10c the magnetic actuator consists of an array of electromagnetic coils 107 disposed an a printed circuit board 108. Other than shown in FIG. 10c, the array of electromagnetic coils can be multi-layered. The electromagnetic coils can be switched on and off in a coordinated fashion. The magnetic field thus travels via activating and deactivating the individual coils in a coordinated sequence. Moreover, the electromagnetic field is enhanced by a strong permanent magnet 109 which creates a static magnetic field. Said permanent magnet can as well be replaced by an electromagnet. The latter do not only enhance the strength of the travelling magnetic field, but also serve to magnetize the magnetic beads, if necessary.

Figure 11:
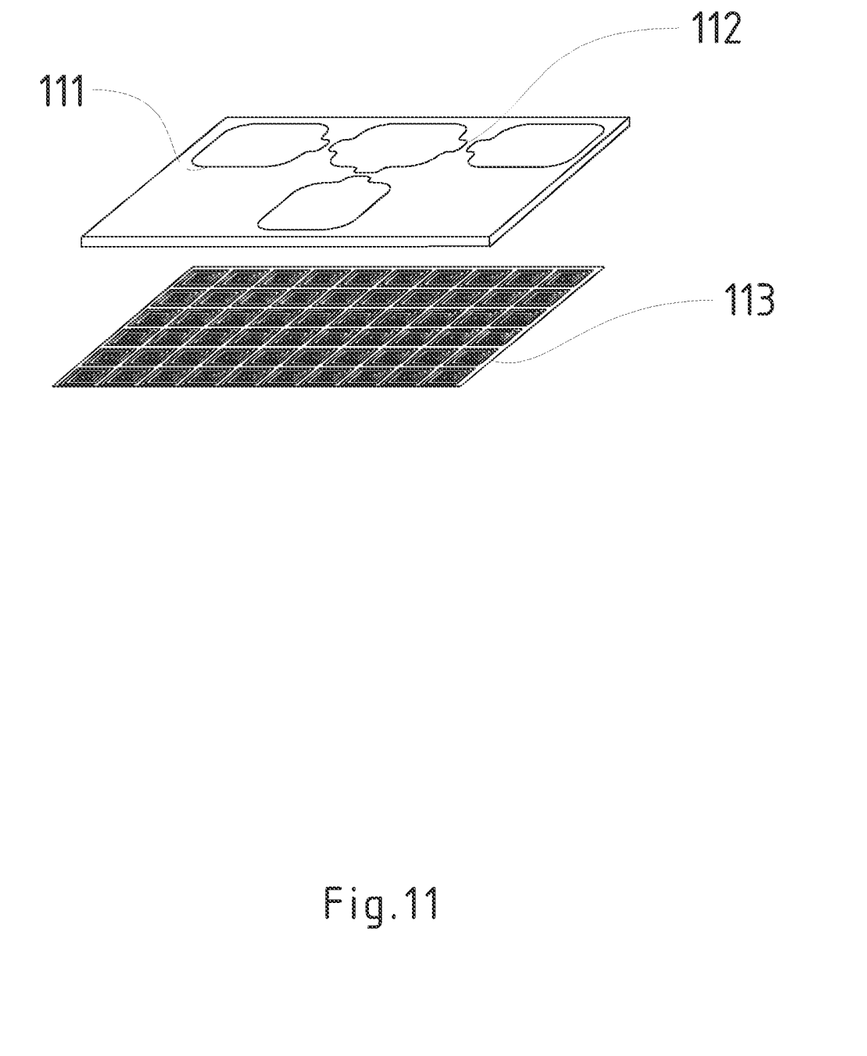
FIG. 11 shows a device according to the invention in an exploded view.

FIG. 11 shows a device according to the invention in an exploded view. The device comprises hydrophilic areas 111 separated from one another by hydrophobic areas 112. Furthermore, the device comprises a printed circuit board 113 an array of electromagnetic coils, which can be switched on and off in a coordinated fashion in order to create a travelling magnetic field. Other components, like a permanent magnet for the creation of a static magnetic field, or liquid droplets comprising magnetic beads, are not shown in FIG. 11

EXAMPLES

Example 1

Experiments have been done with two kinds of devices. Both devices consist of a first solid substrate and a second solid substrate, which are separated from one another by a spacer (in this case by double sided adhesive tape of 100 µm thickness). The first solid substrate has a patterned surface comprising at least two hydrophilic areas separated from one another by at least one hydrophobic area.

In device 1, the second solid substrate has a hydrophobic surface, while in device 2, the second solid substrate has a hydrophilic surface.

The first solid substrate of both devices is a microscope glass slide on which a self-assembled monolayer (SAM) of perfluorodecyl-tri-etoxysilane is applied. This SAM is partly removed by oxygen plasma treatment, leaving a pattern of hydrophilic chambers as islands in a hydrophobic background. For device 1, the second solid substrate is a slide of PMMA that has been dipcoated in Teflon AF 1600. For device 2, the second solid substrate is an untreated slide of PMMA.

The fluor-rich SAM has a contact angle of about 105°. Untreated PMMA has a contact angle of about 75°, whereas PMMA dipcoated in Teflon AF 1600 has a contact angle of about 115°.

The second solid substrate is disposed upon the first solid substrate by means of spacers, i.e., 100 µm thick double-sided adhesive tape. The second substrate has a filling holes right above the hydrophilic areas.

In both devices, a droplet of water (10 µl) containing magnetic particles (Dynal M270 beads, 2.7 µm diameter) is injected through a filling hole, which gathers in the first hydrophilic area, while in the other hydrophilic area, a droplet of water without magnetic particles is injected.

A magnetic actuator is then disposed below the devices, beneath the border of the first hydrophilic area and the hydrophobic area (separation area). Immediately, the magnetic particles assemble in the area where the magnetic actuator is disposed.

The magnetic actuator then travels into the direction of the second hydrophilic area, thus creating a passage of aqueous liquid bridging the hydrophobic area. Once the actuator has passed the said hydrophobic area and comes to a rest in the second hydrophilic area,
  i. the passage of aqueous liquid bridging the hydrophobic area breaks down in device 1, while
  ii. the passage of aqueous liquid bridging the hydrophobic area remains stable in device 2

The first mode of valve actuation may also be termed "phasic valve actuation mode", or "pinch off mode", while the second mode of valve actuation is also termed "tonic valve actuation mode".

The reason for this is that in device 1, the second solid substrate has a hydrophobic surface, while in device 2, the second solid substrate has a hydrophilic surface (see above).

REFERENCES

Liu R H, Bonanno J Yang J, Lenigk R, Grodzinski P (2004): Single-use, thermally actuated paraffin valves, Sensors and Actuators B 98; 328-336

The invention claimed is:

1. A device including a hydrophobic valve for liquids having an appreciable surface tension comprising magnetic particles, said device comprising
  at least first and second substrates each having a functionalized surface that includes at least one surface region having one of a hydrophilic and hydrophobic characteristic, wherein the functionalized surface of the first substrate comprises a patterned surface having at least first and second hydrophilic areas separated from one another by at least one hydrophobic area, wherein the first and second substrates are disposed with a distance to one another in a sandwiched, parallel fashion, in such way that said functionalized surfaces are facing one another; and
  a traveling magnetic field generator configured to generate a magnetic field and to controllably move the magnetic field from a boundary between the first hydrophilic area and the hydrophobic area, to the second hydrophilic area.

2. The device of claim 1, wherein the functionalized surface of the second substrate has hydrophobic properties and comprises at least one material selected from the group consisting of
  silanized substrates,
  fluorocarbon-coated substrates,
  substrates being equipped with a Lotus effect,
  thiol-coated substrates,
  self-assembled monolayers,
  polytetrafluorethylene (PTFE),
  structural amorphous metal (SAM).

3. The device of claim 1, wherein the liquids are aqueous liquids.

4. The device of claim 1, wherein the traveling magnetic field generator includes at least one selected from the group consisting of
  at least one permanent magnet and
  at least one electromagnet.

5. The device of claim 1, wherein the second substrate has a hydrophilic surface.

6. The device of claim 1, wherein the second substrate has a hydrophobic surface.

7. The device of claim 5, wherein the functionalized surface of the second solid substrate is hydrophobic and has a contact angle hysteresis of at least 27°.

8. The device of claim 1, wherein the device is a microfluidic device.

9. The device of claim 8, wherein the width of at least one hydrophobic area is smaller than the widths of the first and second hydrophilic areas.

10. The device of claim 8, wherein the device is comprises a lab-on-a-chip.

11. The device of claim 1, wherein the device is a Lab-on-a-chip device.

12. The device of claim 11, further comprising at least one device from the group consisting of:
  Cell sample preparation device
  Sampler agitation unit (stirrer)
  Nucleic acid isolation device
  Nucleic acid purification device
  Nucleic add extraction device
  Sample preparation device
  Immunoassay
  Electrophoresis device
  Nucleic add hybridization unit
  PCR thermocycler
  Fluorescence read out unit on-chip chemical reaction applications.

13. The device of claim 1, wherein the travelling magnetic field generator comprises a magnet and a rail on which the magnet travels in parallel to the first and second substrates to move the magnetic field from the boundary between the first hydrophilic area and the hydrophobic area, to the second hydrophilic area.

14. The device of claim 1, wherein the travelling magnetic field generator comprises an array of electromagnets configured to be turned on and off in a coordinated manner to move the magnetic field from the boundary between the first hydrophilic area and the hydrophobic area, to the second hydrophilic area.

15. The device of claim 1, wherein the travelling magnetic field generator comprises an array of electromagnetic coils disposed on a printed circuit board in parallel with the first and second substrates, wherein the array of electromagnetic coils is configured to be turned on and off in a coordinated manner to move the magnetic field from the boundary between the first hydrophilic area and the hydrophobic area, to the second hydrophilic area.

16. The device of claim 1, further comprising a static magnetic generator comprising one of a permanent magnet and an electromagnet, configured to generate a static magnetic field, wherein the static magnetic field is stronger than the magnetic field generated by the travelling magnetic field generator.

17. The device of claim 1, wherein the wherein the functionalized surface of the second substrate is completely hydrophobic.

18. The device of claim 1, wherein the wherein the functionalized surface of the second substrate is completely hydrophilic.

19. The device of claim 1, wherein the first and second hydrophilic areas of the functionalized surface of the first substrate are each completely surrounded by one or more hydrophobic areas.

20. A method for controlling liquid flow in a microfluidic device comprising a hydrophobic valve for liquids having an appreciable surface tension comprising magnetic particles, the device comprising: at least two planar solid substrates with a functionalized surface each, wherein at least a first solid substrate has a patterned surface comprising at least two hydrophilic areas separated from one another by at least one hydrophobic area, wherein the two planar substrates are disposed with a distance to one another in a sandwiched, parallel fashion, in such way that said functionalized surface are facing one another, and wherein the valve further comprises a magnetic actuator, in which at least one first hydrophilic area is loaded with an aqueous liquid comprising magnetic particles, said method comprising a) creating a magnetic field at a position near a first hydrophilic area
   b) travelling the magnetic field in a direction parallel to the directions of the two planar solid substrates from a position near a first hydrophilic area to a position near a second hydrophilic area;
   c) the travelling magnetic field, on its way, passing by a position near a hydrophobic area which separates the said hydrophilic areas;
   d) thereby creating, at least temporally, a passage of aqueous liquid bridging the hydrophobic area which separates the said hydrophilic areas; in such way that aqueous liquid may pass, at least temporally, from the first hydrophilic area to the second hydrophilic area.

* * * * *